United States Patent [19]
Li et al.

[11] Patent Number: 5,973,642
[45] Date of Patent: Oct. 26, 1999

[54] ADAPTIVE ANTENNA ARRAYS FOR ORTHOGONAL FREQUENCY DIVISION MULTIPLEXING SYSTEMS WITH CO-CHANNEL INTERFERENCE

[75] Inventors: Ye Li, Atlantic Highlands; Nelson Ray Sollenberger, Tinton Falls, both of N.J.

[73] Assignee: AT&T Corp., New York, N.Y.

[21] Appl. No.: 09/053,281

[22] Filed: Apr. 1, 1998

[51] Int. Cl.[6] .................................. G01S 3/16; G01S 3/28
[52] U.S. Cl. .................................. 342/378; 455/63
[58] Field of Search .................................. 342/378; 455/63

[56] References Cited

U.S. PATENT DOCUMENTS

| | | | |
|---|---|---|---|
| 5,483,550 | 1/1996 | Hulbert | 375/202 |
| 5,524,023 | 6/1996 | Tsujimoto | 375/232 |
| 5,550,872 | 8/1996 | Liberti, Jr. et al. | 375/347 |
| 5,771,439 | 6/1998 | Kennedy, Jr. et al. | 455/63 |

OTHER PUBLICATIONS

Burton R. Saltzberg, "Performance of an Efficient Parallel Data Transmission System", IEEE Transactions on Communication Technology, Dec. 1967.

S. B. Weinstein, "Data Transmission by Freuency–Division Multiplexing Using the Discrete Fourier Transform", IEEE Transactions on Communication Technology, Oct. 1971.

Leonard J. Cimini, Jr., "Analysis and Simulation of a Digital Mobile Channel Using Orthogonal Frequency Division Multiplexing", IEEE Transactions on Communications, Jul. 1985.

Jack H. Winters,, "Signal Acquisition and tracking with adaptive Arrays in the Digital Mobile Radio System IS–54 with Flat Fading", IEEE Transactions on Vehicular Technology, Nov. 1993.

Jack H. Winters et al., "The Impact of Antenna Diversity on the Capacity of Wireless Communication Systems", IEEE Transactions on Communications, 1994.

Jan–Jaap Van De Beek et al., "On Channel Estimation in OFDM Systems", IEEE, 1995.

Ove Edfors et al., "OFDM Channel Estimation by Singular Value Decomposition", 1996 IEEE 46th Vehicular Technology Conference.

Vittoria Mignone et al., "CD3–OFDM: A Novel Demodulation Scheme for Fixed and Mobile Receivers", IEEE Transactions on Communications, Sep. 1996.

Robert L. Cupo et al., "A Four–Element Adaptive Antenna Array For IS–136 PCS Base Stations", 1997 IEEE 47th Vehicular Technology Conference, May 1997.

Ye (Geoffrey) LI et al., "Parameter Tracking of STE for IS–136 TDMA Systems with Rapid Dispersive Fading and Co–channel Interference", 1997 International Symposium on Personal, Indoor and Mobile Radio Communications, Proceedings, Sep. 1997.

Leonard J. Cimini, Jr. et al., "OFDM with Diversity and Coding for Advanced Cellular Internet Services", GLOBECOM 97, IEEE Global Telecommunications Conference, Nov. 1997.

*Primary Examiner*—Theodore M. Blum

[57] ABSTRACT

A technique for estimating parameters for adaptive antenna arrays in orthogonal frequency division multiplexing systems with co-channel interference is disclosed. Channel parameter estimation is preferentially performed using a two pass process that advantageously expands the temporal scope (relative to a single pass process) and considers past, present and future temporal channel estimations during parameter estimation. Channel parameters are estimated by processing the signals through fast Fourier transforms, temporal filters, and inverse fast Fourier transforms. The temporal filters optimize parameter estimation based upon instantaneous correlation of the received signals.

28 Claims, 2 Drawing Sheets

ADAPTIVE ANTENNA ARRAYS FOR ORTHOGONAL FREQUENCY DIVISION MULTIPLEXING SYSTEMS WITH CO-CHANNEL INTERFERENCE

FIELD OF THE INVENTION

The invention relates generally to adaptive antenna arrays. More particularly, the invention relates to adaptive antenna arrays for Orthogonal Frequency Division Multiplexing (OFDM) systems with co-channel interference.

BACKGROUND OF THE INVENTION

Orthogonal frequency division multiplexing is an efficient technique for high speed data transmission such as that needed for wireless data systems. Orthogonal frequency division multiplexing is a form of multicarrier modulation.

Multicarrier modulation systems with orthogonal sub-carriers having overlapping frequencies have been known since the late 1960s. R. W. Chang first described such a system in an article in the *Bell Systems Technical Journal* entitled "Synthesis of Band-Limited Orthogonal Signals for Multicarrier Data Transmission," pp. 1775–1796, December 1966. A similar system was described by B. R. Saltzberg in "Performance of an Efficient Parallel Data Transmission System," *IEEE Transactions on Communication Technology*, Vol. COM-15, No. 6, pp. 805–811, December 1967. In these systems, each sub-carrier overlapped only its two nearest frequency neighbors. The orthogonality between the overlapping sub-carriers was maintained by staggering, or time offset, of the in-phase and quadrature-phase components (so-called staggered quadrature amplitude modulation).

In 1971, an orthogonal frequency division multiplexing system using fast Fourier transforms to generate orthogonal wave forms was described in an article by S. B. Weinstein and P. M. Ebert entitled "Data Transmission by Frequency Division Multiplexing Using the Discrete Fourier Transform," *IEEE Transactions on Communication Technology*, Vol. COM-19, No. 5, pp. 628–634, October 1971. In this type of orthogonal frequency division multiplexing system, the data symbols are processed in the transmitter by an inverse fast Fourier transform and in the receiver by a fast Fourier transform. The symbols are time-limited and all sub-carriers overlap each other in the frequency domain. In such systems wherein data is transmitted in parallel, longer symbol intervals are possible, reducing sensitivity to impulse noise and providing high spectral efficiency by frequency overlapping. Advantageously, long symbols reduce the problems of inter-symbol interference. Accordingly, orthogonal frequency division multiplexing is an extremely effective technique for combating multipath fading such as that encountered over mobile wireless channels.

Orthogonal frequency domain multiplexing systems are being proposed for or used in wireless data transmission in a wide variety of applications including high definition television, cellular mobile telephony, and personal communications systems (PCS). It is in the area of mobile communication systems (i.e., cellular phones) that the benefits of orthogonal frequency division multiplexing appear to make it an optimal solution to the problems of limited bandwidth.

Orthogonality is a property of a set of functions such that the integral of the product of any two members of the set taken over the appropriate interval is zero. For example, trigonometric functions appearing in Fourier expansions (e.g., sines and cosines) are orthogonal functions. Orthogonality is desirable in communication because orthogonal channels or frequencies are statistically independent and do not interfere with each other, allowing for greater bandwidth density.

Orthogonality ensures that a receiver demodulating a selected carrier demodulates only that carrier without simultaneously and unintentionally demodulating the other carriers that are providing parallel data transmission along the multiplexed communication channel. Accordingly, there is no cross talk between carriers even though the carrier spectra overlap and there is no requirement of explicit filtering.

Orthogonal frequency division multiplexing systems may be subject to co-channel interference in a cellular mobile communications environment in which frequency reuse considerations result in the same carrier frequency being used for different communications in adjacent or nearby cells. Co-channel interference occurs when the same frequency is allocated to different conversations or data communications in adjacent cells in a cellular system such as used for mobile telephones. For those systems that are subject to co-channel interference, adaptive antenna arrays are considered highly desirable to suppress the co-channel interference. For example, adaptive antenna arrays have proved effective at suppressing co-channel interference and mitigating rapid dispersive fading and accordingly increasing channel capacity in Time Division Multiple Access (TDMA) systems.

Adaptive antenna arrays are capable of providing optimal gain as well as minimizing interfering signals. An adaptive antenna array typically includes an array of two or more elements with outputs that can be adaptively combined to control signal reception. The antenna elements can be arranged in linear, circular or planar configurations and are normally installed at base stations, although they may also be used in mobile telephones or portable computers. Adaptive antenna arrays are effective in reducing co-channel interference.

However, utilization of an adaptive antenna array is best accomplished using a minimum mean-square-error (MMSE) diversity combiner (DC), in which case it is necessary to estimate certain parameters for the minimum mean-square-error diversity combiner as they will not be known and accordingly must be estimated. The signals received by the separate antennas are independently demodulated before being applied to a diversity combiner.

Each received symbol is then evaluated based on a minimum mean square error. The minimum mean square error is a measure of the error probability in a signal based upon the mean value of the square of the error, $(y-\bar{y})^2$, where $\bar{y}$ is any estimate of y. In general, if y is any random variable having a mean value of $\overline{y}$, then choosing $\bar{y}=\overline{y}$ minimizes the mean square error. Of course, without having the values of y it is impossible to precisely evaluate $\overline{y}$. Rather, it is necessary to estimate the mean value of y, $\overline{y}$, based on supplied parameters. The accuracy and usefulness of the estimated mean square error is related to the quality of the parameters used in the estimation thereof.

In an adaptive antenna array, selection of appropriate parameters that accurately describe channel characteristics will minimize the mean square error of the received signal and accordingly decrease the signal error rate, effectively suppressing interference and maintaining signal quality.

A diversity combiner is used for diversity reception in an adaptive antenna array. Diversity reception is essentially multiple reception of transmitted information (i.e., from two or more antennas, the signals from which are separately demodulated) in order to reduce transmission errors and accurately receive the transmitted information. Diversity reception typically reduces or eliminates drop outs caused by multi-path phase cancellations (i.e., multi-path fading). Diversity combining also produces gain (relative to diversity switching or non-diverse reception) by effectively combining the power of multiple received signals. The signal to noise ratio (and the signal to interference ratio) may also be maximized.

It is considered desirable to implement an orthogonal frequency division multiplexing communication system in a digital cellular telephone network in order to provide resistance to intersymbol interference and thus better enable interference rejection. However, co-channel interference undesirably limits the performance of such a system. Adaptive antenna arrays offer a solution to the problem of co-channel interference in an orthogonal frequency division multiplexing system, but an adaptive antenna array is only viable if the parameters needed to optimize performance to reliably extract the transmitted information can be readily obtained.

SUMMARY OF THE INVENTION

In view of the foregoing, there is a need for an efficient technique for estimation of parameters that reduce co-channel interference in orthogonal frequency division multiplexing systems using adaptive antenna arrays.

The most important of these parameters are those required for the minimum mean-square-error diversity combiner. The parameters for diversity combining can be calculated using the channel parameters and the instantaneous correlation of the received signals. Unlike orthogonal frequency division multiplexing systems without co-channel interference, in which the equivalent to the minimum mean-square-error diversity combiner (the maximal-ratio diversity combiner) can be obtained without knowledge of instantaneous correlation of received signals, both the channel parameters and the instantaneous correlation of received signals are required for effective operation of an adaptive antenna array minimum mean-square-error diversity combiner.

Accordingly, a parameter estimator for a minimum mean-square-error diversity combiner should take into account both the independently demodulated received signals (in order to determine the conditioned correlation therebetween) and the combined received signal after demodulation and decoding by the receiver. In a preferred embodiment of the invention where the information is encoded as a Reed-Solomon code, the parameter estimator considers the combined received signal characteristics before and after Reed-Solomon decoding.

The minimum mean-square-error diversity combiner parameter estimator estimates parameters using the channel characteristics derived from the received signal and the block and tone characteristics of the diverse received signals. An instantaneous correlation estimator that generates parameters for a diagonal loading direct matrix inversion (DMI/DL) algorithm is described below. As known to those of skill in the art, the diagonal loading direct matrix inversion algorithm can be effectively used to enhance reception of a desired signal and suppress interference in an adaptive antenna array. Accordingly, the diagonal loading direct matrix inversion algorithm is utilized in a preferred embodiment of the present invention.

An alternative preferred embodiment of the present invention is also disclosed in which reference generation is enhanced by expanding the temporal scope to account for past, present and future temporal channel estimations utilizing a multiple pass system. Because future references (relative to a time n) may be determined from a preceding pass, it is possible to refine channel estimations and accordingly achieve better parameters. It is believed that enhanced channel parameters and instantaneous correlation parameters derived thereby can result in significantly improved performance without introducing an undesirable level of complexity or unduly delaying demodulation.

DETAILED DESCRIPTION

A novel technique for estimation of parameters for a minimum mean-square-error diversity combiner in an adaptive antenna array used in an orthogonal frequency division multiplexing communication system is described herein. By including instantaneous correlation parameters, co-channel interference in a cellular communications system may be reduced.

Figure 1:
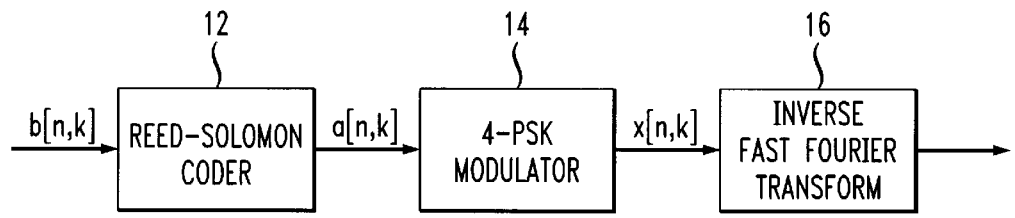
FIG. 1 is a schematic representation of an orthogonal frequency division multiplexing system transmitter.

A transmitter for use in an orthogonal frequency division multiplexing system with receiver diversity is shown in FIG. 1. The transmitter 10 may be represented by three functional blocks in which a digital input signal is converted into an output signal suitable for orthogonal frequency division multiplexing communication. A digital input signal b[n,k] is input to a coder 12 for error-correction coding. In a preferred embodiment of the present invention, Reed-Solomon codes are used for error-correction coding. However, other error-correcting codes may also be used. The output of coder 12, a[n,k], is applied to a modulator 14. In a preferred embodiment of the present invention, coherent phase shift keying modulation (PSK) is used. Other forms of signal modulation may also be used in accordance with unique implementation considerations. The output of modulator 14, x[n,k], is applied to inverse fast Fourier transform 16 and output to signal amplification and propagation circuitry which is dependent upon the particular implementation.

Figure 2:
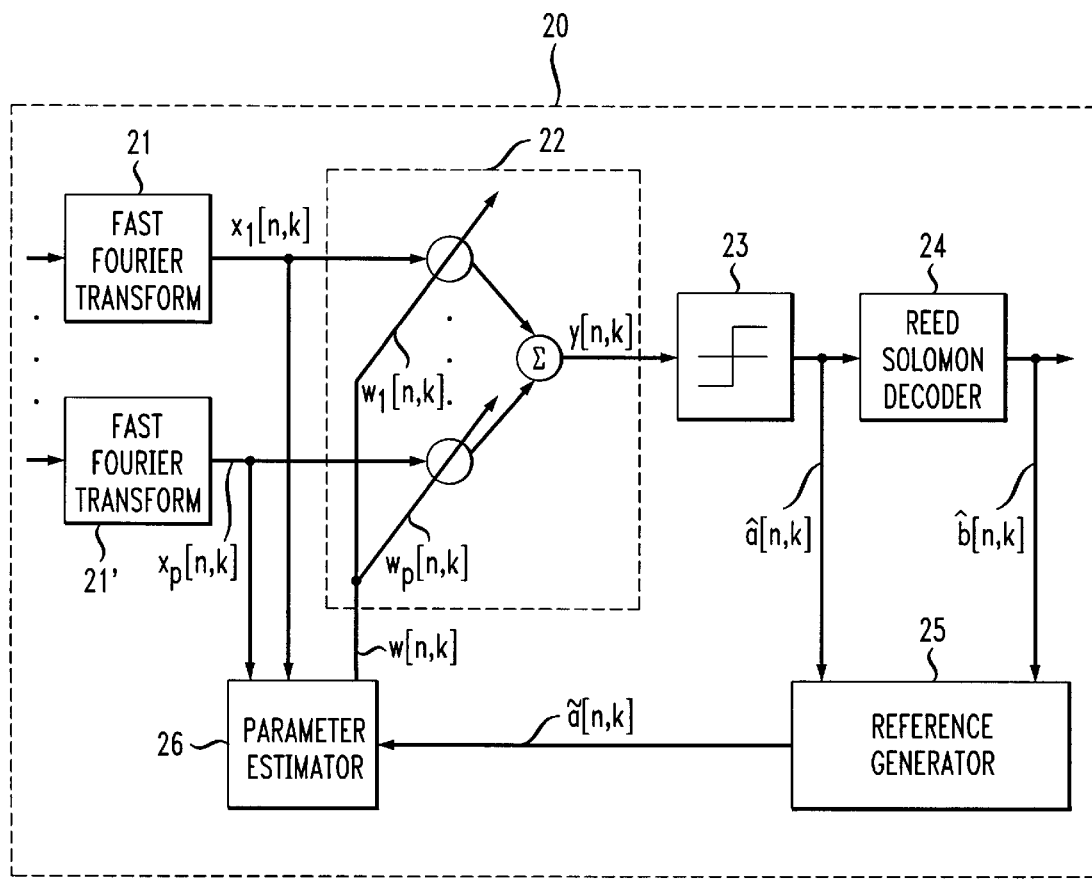
FIG. 2 is a schematic representation of an embodiment of an orthogonal frequency division multiplexing system receiver in accordance with the present invention.

Referring to FIG. 2, a receiver for use in an orthogonal frequency division multiplexing communication system in accordance with an embodiment of the present invention is illustrated. A communication signal is received by a plurality of antennas and the modulation signals received at each antenna are coupled to fast Fourier transforms 21–21'. The output of fast Fourier transforms 21–21', $x_1[n,k]$–$x_p[n,k]$, are applied to minimum mean-square-error diversity combiner 22 and parameter estimator 26. Minimum mean-square-error diversity combiner 22 combines the received signals and processes the received signals in accordance with the co-channel interference and channel characteristics and outputs a bitstream y[n,k] to slicer 23. Slicer 23 divides the input data into received signal â[n,k] which is applied to reference generator 25 and error-correction decoder 24. In a preferred embodiment of the present invention, data is transmitted in blocks and each block forms a Reed-Solomon code word. As noted above, Reed-Solomon codes are used for error-correction coding in a preferred embodiment of the present invention, although other error-correction coding schemes may also be used.

The error corrected signal, b̂[n,k], is output for implementation specific additional processing and applied to reference generator 25. Reference generator 25 selects either the output of slicer 23, â[n,k], or the output of Reed-Solomon decoder 24, b̂[n,k], and outputs an estimated received signal, ã[n,k], that is applied to minimum mean-square-error diversity combiner parameter estimator 26. Reference generator 25 is a dual mode reference generator that generates undercoded and decoded references. If Reed-Solomon decoder 24 successfully corrects all errors in a received orthogonal frequency division multiplexed block, then the reference for the block is generated by the decoded data and ã[n,k]=a[n,k]. If, on the other hand, Reed-Solomon decoder 24 cannot correct all the errors, then the decision symbols output from slicer 23 are used as reference signals and ã[n,k]=â[n,k]. In alternative embodiments of the present invention, undercoded reference generating, where ã[n,k]=â[n,k] without reference to the operation of a decoder may be used, as well as other types of reference generating schemes known in the art such as decoded/CMA dual mode or error removal reference generation. The minimum mean-square-error diversity combiner parameter estimator 26 then generates diagonal loading direct matrix inversion algorithm parameters w[n,k] for minimum mean-square-error diversity combiner 22.

In an orthogonal frequency division multiplexing system with receiver diversity obtained from an adaptive antenna array, the received signal from the mth antenna at the kth tone of the nth block can be expressed by the following equation.

$$X_m[n,k] = H_m^{(0)}[n,k]s_0[n,k] + v_m[n,k] \quad (1)$$

In equation 1, for all n and k=0, ..., K−1, K is the number of subchannels, $s_0[n,k]$ is the transmitted data at the corresponding block and tone, $H_m^{(0)}[n,k]$ is the desired frequency response for the desired signal from the mth antenna at the corresponding block and tone, and $v_m[n,k]$ includes additive complex white Gaussian noise and co-channel interference.

In an orthogonal frequency division multiplexing system with L co-channel interferers, $V_m[n,k]$ (noise and co-channel interference) can be expressed by the following equation.

$$v_m[n,k] = \sum_{l=1}^{L} H_m^{(l)}[n,k]s_l[n,k] + n_m[n,k] \quad (2)$$

In equation 2, the series $H_m^{(l)}[n,k]$ for l=1, ..., L represents the frequency response corresponding to the lth co-channel interferer at the mth antenna at the corresponding block and tone, $s_l[n,k]$ for l=1, ..., L represents the complex data from the lth co-channel interferer, and $n_m[n,k]$ for m=1, ..., L represents the additive complex white Gaussian noise from the mth antenna.

Accordingly, the instantaneous correlation of the received signals from the ith antenna and the jth antenna corresponding to the same block and tone, $r_{ij}[n,k]$, can be defined in terms of the conditional expectations given the channel parameters corresponding to both desired signal and interference as described in the equation 3 wherein $H_j^{(l)*}$ is the complex conjugate of $H_j^{(l)}$ and $\sigma^2$ is the variance of signal noise.

$$r_{ij}[n,k] = \sum_{l=0}^{L} H_i^{(l)}[n,k]H_j^{(l)*}[n,k] + \sigma^2 \delta[i-j] \quad (3)$$

The parameters for the minimum mean-square-error diversity combiner can be calculated in accordance with the diagonal loading direct matrix inversion algorithm from the $r_{ij}[n,k]$ and $H_i^{(0)}[n,k]$ values as shown in equation 4.

$$w[n,k] = (R[n,k] + \gamma I)^{-1} H^{(0)}[n,k] \quad (4)$$

In equation 4, I is a p×p identity matrix and γ is a diagonal loading factor that may be determined by one of a plurality of optimization strategies as known to those of ordinary skill in the art. The instantaneous correlation matrix R[n,k] is also a p×p matrix defined as shown in equation 5.

$$R[n,k] = \begin{pmatrix} r_{11}[n,k] & r_{12}[n,k] & \cdots & r_{1p}[n,k] \\ r_{21}[n,k] & r_{22}[n,k] & \cdots & r_{2p}[n,k] \\ \vdots & \vdots & \cdots & \vdots \\ r_{p1}[n,k] & r_{p2}[n,k] & \cdots & r_{pp}[n,k] \end{pmatrix} \quad (5)$$

The desired channel vector representing the desired frequency response for the desired signal, $H^{(0)}[n,k]$, has p elements defined as shown in equation 6.

$$(H_1^{(0)}[n,k], \ldots, H_p^{(0)}[n,k])^T \quad (6)$$

The received signal vector, $x[n,k] \triangleq (x_1[n,k], x_2[n,k], \ldots, x_p[n,k])^T$, and the parameter vector w[n,k] provide a minimum mean square estimation of the desired signal, a[n,k]; $y[n,k] = w^H[n,k]x[n,k]$. The matrix $w^H[n,k]$ is a complex conjugate transform or Hermitian matrix.

As discussed above, instantaneous correlation of received signals and application to a minimum mean-square-error diversity combiner of parameters derived therefrom suppresses co-channel interference. In an orthogonal frequency division multiplexing system, the received signals are correlated for different blocks and tones and the temporal estimation of instantaneous correlation between signals received by the ith and jth antennas, $\tilde{r}_{ij}[n,k]$, is defined as $x_i[n,k] \cdot x_j^*[n,k]$. Accordingly, the minimum mean-square-error estimator for $r_{ij}[n,k]$ may be constructed as shown in equation 7.

$$\hat{r}_{ij}[n,k] = \sum_{m=-\infty}^{+\infty} \sum_{l=-(K-k)}^{k-1} f_{ij}[m,l,k]\tilde{r}_{ij}[n-m,k-l] \quad (7)$$

In equation 7, the values of the coefficients for the minimum mean-square-error estimator, $f_{ij}[m,l,k]$, are selected to minimize the mean-square-error, MSE({f[m,l,k]}), which may be expressed as shown in equation 8.

$$MSE(\{f[m,l,k]\}) = E|\hat{r}_{ij}[n,k] - r_{ij}[n,k]|^2 \quad (8)$$

The coefficient values of f[m,l,k] are, in accordance with the orthogonality principle, determined as shown in equation 9 for co-channel interferers l=−(K−k), ..., (k−1) and antennas m=0, ±1, ±2, ..., .

$$\sum_{m_1=-\infty}^{+\infty} \sum_{l_1=-(K-k)}^{k-1} f_{ij}[m_1, l_1, k] o_{ij}[m-m_1, l-l_1] = p_{ij}[m, l] \quad (9)$$

The elements of the series described in equation 9 are defined as shown in equations 10 and 11; $o_{ij}[m,l]$ is defined as shown in equation 10 and $p_{ij}[m,l]$ is defined as shown in equation 11.

$$o_{ij}[m,1]=E(\tilde{r}_{ij}[n+m,k+l]\tilde{r}_{ij}^*[n,k]) \quad (10)$$

$$p_{ij}[m,1]=E(r_{ij}[n+m,k+l]\tilde{r}_{ij}^*[n,k]) \quad (11)$$

Equation 9 can be expressed in matrix form as shown in equation 12.

$$\sum_{m_1=-\infty}^{+\infty} O_{ij}[m-m_1]F_{ij}[m_1] = P_{ij}[m_1] \quad (12)$$

The matrices, $F_{ij}[m]$, $O_{ij}[m]$, and $P_{ij}[m]$ are defined as shown in equations 13, 14, and 15, respectively.

$$F_{ij}[m] = \begin{pmatrix} f_{ij}[m,-(K-1),1] & f_{ij}[m,-(K-2),2] & \cdots & f_{ij}[m,0,K] \\ f_{ij}[m,-(K-2),1] & f_{ij}[m,-(K-3),2] & \cdots & f_{ij}[m,1,K] \\ \vdots & \vdots & \cdots & \vdots \\ f_{ij}[m,0,1] & f_{ij}[m,1,2] & \cdots & f_{ij}[m,K-1,K] \end{pmatrix} \quad (13)$$

$$O_{ij}[m] = \begin{pmatrix} o_{ij}[m,0] & o_{ij}[m,1] & \cdots & o_{ij}[m,K-1] \\ o_{ij}[m,-1] & o_{ij}[m,0] & \cdots & o_{ij}[m,K-2] \\ \vdots & \vdots & \cdots & \vdots \\ o_{ij}[m,-(K-1)] & o_{ij}[m,-(K-2)] & \cdots & o_{ij}[m,0] \end{pmatrix} \quad (14)$$

$$P_{ij}[m] = \begin{pmatrix} p_{ij}[m,0] & p_{ij}[m,1] & \cdots & p_{ij}[m,K-1] \\ p_{ij}[m,-1] & p_{ij}[m,0] & \cdots & p_{ij}[m,K-2] \\ \vdots & \vdots & \cdots & \vdots \\ p_{ij}[m,-(K-1)] & p_{ij}[m,-(K-2)] & \cdots & p_{ij}[m,0] \end{pmatrix} \quad (15)$$

The $O_{ij}[m]$ and $P_{ij}[m]$ matrices can also be expressed as shown in equations 16 and 17 respectively;

$$O_{ij}[m]=c_0 s_r[m]S_f + c_1 \delta[i-j]E \quad (16)$$

$$P_{ij}[m]=c_0 s_r[m]S_f + (c_1-c_0)\delta[m]I + c_1\delta[i-j]E \quad (17)$$

where I is a K×K identity matrix, E is a K×K matrix with all elements equal to 1, and frequency domain correlation matrix $S_f$ is a K×K matrix defined as shown in equation 18.

$$S_f = \begin{pmatrix} |r_f[0]|^2 & |r_f[1]|^2 & \cdots & |r_f[K-1]|^2 \\ |r_f[-1]|^2 & |r_f[0]|^2 & \cdots & |r_f[K-2]|^2 \\ \vdots & \vdots & \cdots & \vdots \\ |r_f[-(K-1)]|^2 & |r_f[-(K-2)]|^2 & \cdots & |r_f[0]|^2 \end{pmatrix} \quad (18)$$

As known to those skilled in the art, the frequency domain correlation matrix can be derived for mobile wireless channels as follows. The frequency domain correlation matrix $S_f = WAW^H$, where W is a discrete Fourier transform matrix defined as shown in equation 19 and A is a diagonal matrix with the elements shown in equation 20;

$$W = \frac{1}{\sqrt{K}} \begin{pmatrix} 1 & 1 & \cdots & 1 \\ 1 & e^{j2\frac{\pi}{K}} & \cdots & e^{j2\frac{\pi(K-1)}{K}} \\ \vdots & \vdots & \cdots & \vdots \\ 1 & e^{j2\pi(K-1)} & \cdots & e^{j2\pi(K-1)\frac{(K-1)}{K}} \end{pmatrix} \quad (19)$$

where × denotes circular convolution with modulo K. Since $a_k=0$ for $K_0 \leq k \leq K-K_0$ for a channel with delay spread $t_d$, the values of $P_{ij}[m]$ and $O_{ij}[m]$ for m=0, ±1, ±2, . . . can be simultaneously diagonalized by W as shown in equations 21 and 22.

$$a_k = \frac{1}{K} d_k \otimes d_{-k}^* \quad (20)$$

$$P_{ij}[m] = WD_p[m]W^H \quad (21)$$

$$O_{ij}[m] = WD_o[m]W^H \quad (22)$$

In equation 21, the diagonal matrix $D_p[m]$ has elements as defined in equation 23.

$$d_{p,k}[m]=a_k c_0 s_t[m]+Kc_1\delta[i-j]\delta[k] \quad (23)$$

Similarly, in equation 22, $D_o[m]$ is a diagonal matrix with elements as defined in equation 24.

$$d_{o,k}[m]=a_k c_0 s_t[m]+(c_1-c_0)\delta[m]+Kc_1\delta[i-j]\delta[k] \quad (24)$$

Equation 12 can be expressed in the frequency domain as shown in equation 25.

$$O_{ij}(\omega)F_{ij}(\omega)=P_{ij}(\omega) \quad (25)$$

The frequency domain elements, $O_{ij}(\omega)$, $P_{ij}(\omega)$, and $F_{ij}(\omega)$ of equation 25 are defined as shown in equations 26, 27, and 28 respectively.

$$O_{ij}(\omega) = \sum_{m=-\infty}^{+\infty} O_{ij}[m]e^{-jm\omega} \quad (26)$$

$$P_{ij}(\omega) = \sum_{m=-\infty}^{+\infty} P_{ij}[m]e^{-jm\omega} \quad (27)$$

$$F_{ij}(\omega) = \sum_{m=-\infty}^{+\infty} F_{ij}[m]e^{-jm\omega} \quad (28)$$

The $P_{ij}(\omega)$ and $O_{ij}(\omega)$ elements may be simultaneously diagonalized by W as shown by equations 29 and 30;

$$O_{ij}(\omega)=WD_o(\omega)W^H \quad (29)$$

$$P_{ij}(\omega)=WD_p(\omega)W^H \quad (30)$$

where $D_o(\omega)$ of equation 29 is a diagonal matrix with diagonal elements as shown by equation 31;

$$d_{o,k}(\omega)=\Im\{d_{o,k}[m]\}=a_k c_0 s_t(\omega)+(c_1-c_0)+2\pi Kc_1\delta[i-j]\delta[k]\delta(\omega) \quad (31)$$

where the elements are Fourier transforms of the elements $d_{o,k}[m]$ described in equation 24. With respect to equation 30, $D_p(\omega)$ is a diagonal matrix with diagonal elements as shown in equation 32;

$$d_{p,k}(\omega)=\Im\{d_{p,k}[m]\}=a_k c_0 s_t(\omega)+2\pi Kc_1\delta[i-j]\delta[k]\delta(\omega) \quad (32)$$

where the elements are Fourier transforms of the elements $d_{p,k}[m]$ described in equation 23.

Accordingly, the coefficients of $f_{ij}[m,l,k]$ for the minimum mean-square-error estimation of $r_{ij}[n,k]$ in the frequency domain are determined as shown in equation 33;

$$F_{ij}(\omega) = O_{ij}(\omega) P_{ij}(\omega) = W \Psi(\omega) W^H \qquad (33)$$

where $\Psi(\omega)$ is a diagonal matrix with elements as defined in equation 34.

$$\psi_k(\omega) = \frac{a_k c_0 s_t(\omega) + 2\pi K c_1 \delta(\omega) \delta[i-j] \delta[k]}{a_k c_0 s_t(\omega) + (c_1 - c_0) + 2\pi K c_1 \delta(\omega) \delta[i-j] \delta[k]} \qquad (34)$$

Figure 3:
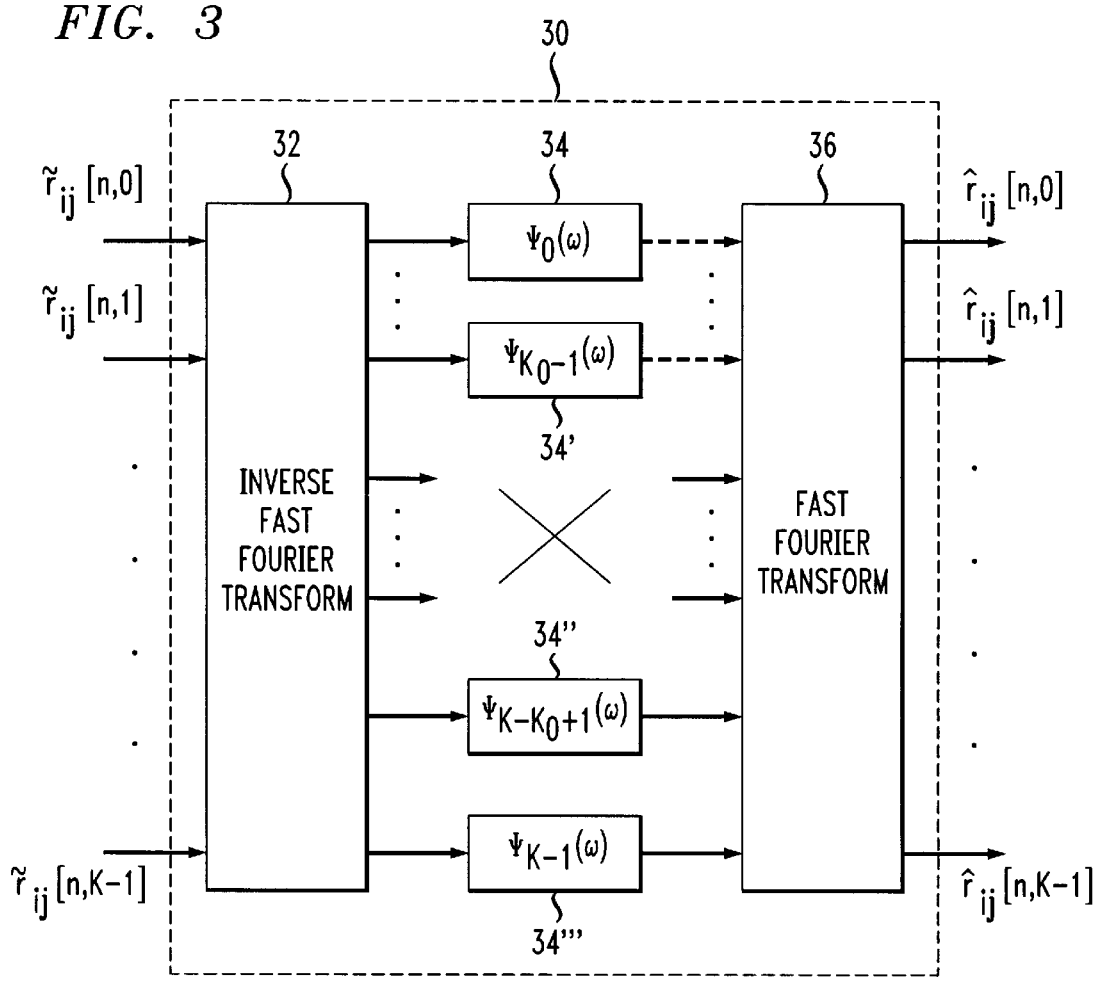
FIG. 3 is a partial block diagram representation of an instantaneous correlation estimator in a parameter estimator in accordance with an embodiment of the present invention.

FIG. 3 is a partial block diagram of a paramter estimator illustrating the estimation of instantaneous correlation of received signals by which the instantaneous correlation matrix R[n,k] is determined. As may be seen by referring to equation 4, the parameters output by a parameter estimator 26, w[n,k], are determined from the instantaneous correlation matrix, R[n,k], the channel characteristics $H^{(0)}[n,k]$, and the mathematically defined identity matrix I and diagonal loading factor $\gamma$. The channel characteristics are provided by reference generator 25.

Referring to FIG. 3, the initial temporal estimations of the instantaneous correlations of signals received from the ith and jth antennas corresponding to the same block n at tones k=0, ..., K−1, in a system with K subchannels are processed by inverse fast Fourier transform 32. As noted above, the temporal estimation of instantaneous correlation between signals received by the ith and jth antennas, $r_{ij}[n,k]$, is defined as $x_i[n,k] \times x_j^*[n,k]$, and this temporal estimation is input to the parameter estimator 26 as shown in FIG. 2. The time domain representations output by inverse fast Fourier transform 32 are processed by temporal filters 34. The temporal filters and Fourier transformations provide a mechanism by which the correlations are themselves correlated with respect to both frequency and time (i.e., correlate simultaneous correlations at the frequency (tone) of interest with correlations at neighboring frequencies (tones) and correlate preceding and subsequent correlations at a specified tone) to obtain improved estimates of the correlations.

In an embodiment of the present invention, the filtering process is in accordance with equation 34. However, in a preferred embodiment of the present invention intended for use with mobile systems where the Doppler frequency is not known, robust correlation is used. Robust correlation provides for optimal operation over a broader range of operating characteristics than precise correlation in which the system is tuned precisely for a single set of operating characteristics (e.g., all receivers moving at a fixed velocity and therefore with identical Doppler frequency channel characteristics). In a precisely correlated system, optimization for particular operating characteristics may result in reduced performance for other operating characteristics resulting in lower overall performance for all operating characteristics whereas a robustly correlated system, on average, has better performance over the range of operating characteristics. In a preferred embodiment using robust correlation, processing by the temporal filters is done in accordance with equation 40 as discussed below.

The filtered signals are then processed by fast Fourier transforms 36 which output an improved estimation of instantaneous correlation, $\bar{r}_{ij}[n,k]$. The improved estimation is then used to determine the parameter vector w[n,k] which is applied to a minimum mean-square-error diversity combiner 22 as shown in FIG. 2.

The average mean square error of an estimator with coefficients as defined in equation 33 can be expressed as described in equation 35.

$$\overline{MSE} = \frac{1}{K} \sum_{k=0}^{K-1} \frac{1}{2\pi} \int_{-\pi}^{\pi} \left[ |\bar{\psi}_k(\omega)|^2 d_{o,k}(\omega) - 2\bar{\psi}_k(\omega) d_{p,k}(\omega) + d_{p,k}(\omega) \right] d\omega \qquad (35)$$

Since $\bar{\psi}_k(\omega) = \psi_k(\omega)$ for the minimum mean-square-error estimator, the average mean square error can be defined as shown in equation 36;

$$\overline{MSE} = \frac{\sigma^4}{K} \sum_{n=0}^{K-1} \frac{1}{2\pi} \int_{-2\omega_d}^{2\omega_d} \frac{a_k \alpha_0 \alpha_1 s_t(\omega)}{a_k \alpha_0 s_t(\omega) + \alpha_1} d\omega \qquad (36)$$

where the values of $\alpha_0$ and $\alpha_1$ are defined as shown in equations 37 and 38 respectively;

$$\alpha_0 = \frac{\sum_{l=0}^{L} \sigma_l^4}{\sigma^4} \qquad (37)$$

$$\alpha_1 = \frac{\left( \sum_{l=0}^{L} \sigma_l^2 + \sigma^2 \right)^2 - \sum_{l=0}^{L} \sigma_l^4}{\sigma^4} \qquad (38)$$

where $\sigma^2$ is the variance in signal noise for the lth co-channel. The average mean-square-error of an estimator matching a spectrum of $P_{2\omega_d}(\omega)$ for any channel with a Doppler frequency less than $\omega_d$ is given by equation 39;

$$\overline{MSE}_h = \frac{\sigma^4}{K} \sum_{n=0}^{K-1} \frac{a_k \alpha_1}{\frac{\pi}{2\omega_d} a_k \alpha_0 + \alpha_1} \qquad (39)$$

where $P_{2\omega_d}(\omega)$ is defined as shown in equation 40 and the elements of the diagonal matrix, $\bar{\psi}_k(\omega)$, are defined as shown in equation 41.

$$p_{2\omega_d}(\omega) = \begin{cases} \frac{\pi}{2\omega_d} & \text{if } |\omega| \leq 2\omega_d \\ 0 & \text{otherwise} \end{cases} \qquad (40)$$

$$\bar{\psi}_k(\omega) = \frac{a_k \alpha_0 \alpha_1 p_{2\omega_d}(\omega)}{a_k \alpha_0 p_{2\omega_d}(\omega) + \alpha_1} \qquad (41)$$

As noted above, the elements of the diagonal matrix A are given by equation 20 and depend upon the channel delay spread, which is typically unknown. For values of k within the range $0 \leq k \leq K_0 - 1$ or $K - K_0 + 1 \leq k \leq K-1$; $\hat{a}_k = 2/\{2K_0 - 1\}$. For all other values of k, $\hat{a}_k = 0$. Accordingly, the average mean-square-error for a robust correlation estimation is given by equation 42.

$$\overline{MSE}_r = \sigma^4 \alpha_0 \frac{\alpha_1}{\frac{\pi K}{2\omega_d (2K_0 - 1)} \alpha_0 + \alpha_1} \qquad (42)$$

The average mean-square-error of equation 42 is applicable to the robust instantaneous correlation estimator for any system with a Doppler frequency less than $2\omega_d$ and a delay spread less than $T_s * K_0 / K$.

In general, instantaneous correlation estimation using $\psi_k(\omega)$, (i.e., $\overline{MSE}_h$) instead of $P_{2\omega d}$, (i.e., $\overline{MSE}_o$) has been determined to result in only slight degradation in normalized average mean-square-errors ($\overline{MSE}/\sigma^4$), although robust instantaneous correlation estimation, ($\overline{MSE}_r$), does result in more significant relative degradation. In order to reduce the relative degradation, an enhanced instantaneous correlation estimator may be used, albeit with some increased complexity.

Figure 4:
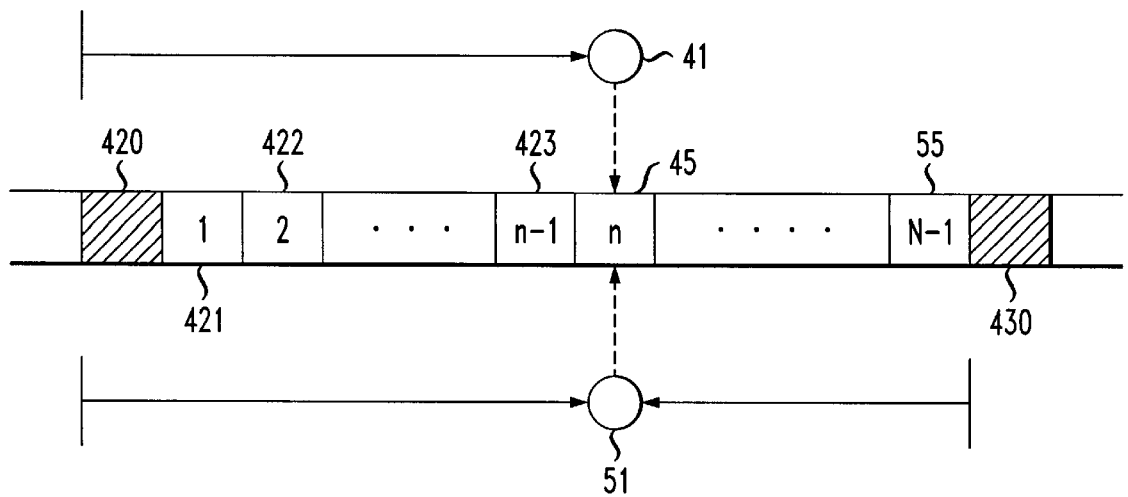
FIG. 4 is representation of second pass channel characteristic estimation in accordance with a preferred embodiment of the present invention.

In a preferred embodiment of the present invention, enhanced instantaneous correlation estimation is achieved by channel parameter estimation using multiple passes instead of a single pass. During single pass estimation, the channel characteristics at a time n are only estimated once and are based on the temporal channel estimation up to the time n. Referring to FIG. 4, parameter estimation 41 at time $T_n$ is based upon channel estimations starting with a first synchronization block 420 and including channel estimations for times $T_1$, (421), $T_2$, (422), ..., $T_{n-1}$, (423), and $T_n$ (45)

Significantly improved channel estimations may be readily made by estimating channel parameters for time $T_n$ with a second pass at a later time $T_n$. By using a second pass, past, current, and future (relative to time $T_n$) temporal channel estimations can be considered when estimating channel characteristics at time $T_n$. The average mean-square-error for multiple pass robust channel estimation using two passes is given by equation 43;

$$\overline{MSE}_s = \cfrac{1}{\cfrac{\pi K}{\omega_d K_0 \rho} + 1} \tag{43}$$

where $\rho$ is defined as shown in equation 44.

$$\rho \triangleq \frac{\sigma^2 + \sum_{l=1}^{L} \sigma_l^2}{\sigma_0^2} \tag{44}$$

Referring again to FIG. 4, a second pass channel estimation 51 for time $T_n$, (45), is made using channel estimations for preceding and subsequent times between synchronization blocks 420 and 430; from $T_1$ (421) to $T_{N-1}$ (55).

As noted above, the parameters for a minimum mean-square-error diversity combiner can be calculated in accordance with the diagonal loading direct matrix inversion algorithm from the $r_{ij}[n,k]$ and $H_i^{(0)}[n,k]$ values as the parameter vector $w[n,k]=(R[n,k]+\gamma I)^{-1}H^{(0)}[n,k]$ where I is a p×p identity matrix and $\gamma$ is a diagonal loading factor.

The parameter vector $w[n,k]$ may be defined as shown by equation 45;

$$w[n,k] = \frac{1}{1 + H^{(0)H}[n,k](R_v[n,k] + \gamma I)^{-1} H^{(0)}[n,k]} \hat{w}[n,k] \tag{45}$$

where $\hat{w}[n,k]$ is defined as shown in equation 46 and $R_v[n,k]$ is defined as shown in equation 47.

$$\hat{w}[n,k]=R_v[n,k]+\gamma I)^{-1}H^{(0)}[n,k] \tag{46}$$

$$R_v=(E\{v_i[n,k]v_j^*[n,k]\})^p{}_{ij}=1 \tag{47}$$

Accordingly, estimated $\hat{w}[n,k]$ and $w[n,k]$ only differ by a positive real amplitude. In a preferred embodiment of the present invention using phase shift keying, information is carried in tone phases and amplitude is therefore not directly related to signal levels. Thus, $\hat{w}[n,k]$ may be used for $w[n,k]$ and $R_v[n,k]$ may be used for $R[n,k]$ in an orthogonal frequency division multiplexing system adaptive antenna array.

The value of $R_v[n,k]$ can be estimated in terms of the estimated frequency response for the desired signal from the mth antenna at the corresponding block and tone, $\hat{H}_m^{(0)}[n,k]$, including additive complex Gaussian noise and co-channel interference, $\hat{v}_m[n,k]$, as shown by equation 48 (assuming ideal data).

$$\hat{v}_m[n,k]=v_m[n,k]+(H_m^{(0)}[n,k]-\hat{H}_m^{(0)}[n,k])s_0[n,k] \tag{48}$$

The average mean-square-error estimate for $R_v[n,k]$ estimation is given by equation 49;

$$\overline{MSE}_r = \sigma^4 \hat{\alpha}_0 \frac{\hat{\alpha}_1}{\frac{\pi K}{2\omega_d(2K_0-1)}\hat{\alpha}_0 + \hat{\alpha}_1} \tag{49}$$

where $E\hat{\alpha}_0$ is defined as shown in equation 50;

$$\hat{\alpha}_0 = \frac{\sum_{l=0}^{L} \sigma_l^4 + \hat{\sigma}_0^4}{\sigma^4} \tag{50}$$

$\hat{\alpha}_1$ is defined as shown in equation 51;

$$\hat{\alpha}_1 = \frac{\left(\sum_{l=0}^{L} \sigma_l^2 + \hat{\sigma}_0^2 \sigma^2\right)^2 - \left(\sum_{l=0}^{L} \sigma_l^4 + \hat{\sigma}_0^4\right)}{\sigma^4} \tag{51}$$

and $\hat{\sigma}_0^2$ is defined as shown in equation 52.

$$\hat{\sigma}_0^2 \triangleq \frac{\sigma_0^2}{\frac{\pi K}{\omega_d K_0 \rho} + 1} \tag{52}$$

It has been demonstrated experimentally that instantaneous correlation estimation based upon a second pass estimation as described above results in substantially less performance degradation than single pass estimation. Although ideal data is unavailable in practicable systems, reference data generated by channel estimation only results in minor performance degradation. In a preferred embodiment, such as illustrated in FIG. 2, a reference generator 25 provides an undercoded/decoded dual mode reference. The reference data, $\tilde{a}$ $a[n,k]$, and the Fourier transforms of the received data, $x_1[n,k]$, ..., $x_p[n,k]$, are used to estimate parameters for the minimum mean-square-error diversity combiner 22.

An orthogonal frequency division multiplexing system can advantageously be optimized for operation with co-channel interference by estimation of instantaneous correlation parameters for a minimum mean-square-error diversity combiner using an adaptive antenna array. Channel parameter estimation is preferentially performed by a two pass process that advantageously expands the temporal scope (over a single pass process) and considers past, present and future temporal channel estimations during parameter estimation.

Although various embodiments are specifically illustrated and described herein, it will be appreciated that modifications and variations of the present invention are covered by the above teachings and within the purview of the appended claims without departing from the spirit and intended scope of the invention.

What is claimed is:

1. A method of suppressing co-channel interference comprising the steps of:
   receiving a plurality of signals in an orthogonal frequency division multiplexing multi-carrier communication system using an adaptive antenna array;
   determining channel parameters for said received signals;
   determining instantaneous correlations for said received signals;
   determining parameter vectors from said channel parameters and said instantaneous correlations; and
   combining a plurality of received signals in a diversity combiner and determining a combined received signal therefrom, said diversity combiner combining said plurality of received signals in accordance with said parameter vectors.

2. The method of suppressing co-channel interference of claim 1 wherein said diversity combiner is a minimum mean-square-error diversity combiner.

3. The method of suppressing co-channel interference of claim 1 wherein said parameter vector is coupled to said diversity combiner by direct matrix inversion.

4. The method of suppressing co-channel interference of claim 1 wherein said parameter vector is coupled to said diversity combiner by diagonal loading.

5. The method of suppressing co-channel interference of claim 1 wherein said parameter vector is estimated.

6. The method of suppressing co-channel interference of claim 5 wherein said parameter vector is estimated from a plurality of Fourier transforms of received signals and a reference signal.

7. The method of suppressing co-channel interference of claim 6 wherein said reference signal is a decoded data signal.

8. The method of supressing co-channel interference of claim 6 wherein said reference signal is a sliced signal or a decoded data signal.

9. The method of suppressing co-channel interference of claim 6 wherein said reference signal is an undercoded data signal.

10. The method of suppressing co-channel interference of claim 6 wherein said parameter vector is estimated by single pass channel parameter estimation.

11. The method of suppressing co-channel interference of claim 6 wherein said parameter vector is estimated by multiple pass channel parameter estimation.

12. The method of suppressing co-channel interference of claim 11 wherein said parameter vector is estimated by two pass channel parameter estimation.

13. A receiver, comprising:
   a plurality of fast Fourier transformers having an input for receiving a received signal from an antenna in an orthogonal frequency division multiplexing multi-carrier communication system adaptive antenna array;
   a diversity combiner having an input coupled to an output of said plurality of Fourier transformers;
   a slicer having an input coupled to an output of said diversity combiner;
   a decoder having an input coupled to an output of said slicer;
   a reference generator having a first input coupled to an output of said decoder and a second input coupled to an output of said slicer; and
   a parameter estimator having an input coupled to an output of said reference generator and having an output coupled to said diversity combiner.

14. The receiver for use with an antenna array in an orthogonal frequency division multiplexing system of claim 13 wherein said diversity combiner is a minimum mean-square-error diversity combiner.

15. The receiver for use with an antenna array in an orthogonal frequency division multiplexing system of claim 13 wherein said decoder is a Reed-Solomon decoder.

16. The receiver for use with an antenna array in an orthogonal frequency division multiplexing system of claim 13 wherein said parameter estimator is a single pass channel parameter estimator.

17. The receiver for use with an antenna array in an orthogonal frequency division multiplexing system of claim 13 wherein said parameter estimator is a multiple pass channel parameter estimator.

18. The receiver for use with an antenna array in an orthogonal frequency division multiplexing system of claim 13 wherein said parameter estimator is a two pass channel parameter estimator.

19. A method of determining instantaneous correlation parameters for a diversity combiner in communication system comprising the steps of:
   processing by inverse Fourier transform a plurality of temporal estimations of instantaneous correlations of signals, corresponding to the same block and tone, received from first and next antennas in an orthogonal frequency division multiplexing multi-carrier communication system adaptive antenna array;
   filtering the inverse Fourier transforms of said plurality of temporal estimations of said instantaneous correlations of signals received from first and next antennas corresponding to the same block and tone; and
   processing by Fourier transform a plurality of filtered inverse Fourier transforms of temporal estimations of instantaneous correlations of signals received from first and next antennas corresponding to the same block and tone, whereby said instantaneous correlation parameters are determined using instantaneous time-domain and frequency-domain channel correlations.

20. The method of determining instantaneous correlation parameters for a diversity combiner in a multicarrier communication system of claim 19 wherein said inverse Fourier transform is an inverse fast Fourier transform.

21. The method of determining instantaneous correlation parameters for a diversity combiner in a multicarrier communication system of claim 19 wherein said Fourier transform is a fast Fourier transform.

22. The method of determining instantaneous correlation parameters for a diversity combiner in a multicarrier communication system of claim 19 wherein the diversity combiner is minimum mean-square-error.

23. The method of determining instantaneous correlation parameters for a diversity combiner in a multicarrier communication system of claim 19 wherein said step of filtering is temporal filtering.

24. The method of determining instantaneous correlation parameters for a diversity combiner in a multicarrier communication system of claim 19 wherein the instantaneous correlation parameters are determined by robust estimation.

25. An instantaneous correlation parameter estimator for a diversity combiner in a multicarrier communication system having a plurality of antennas, said estimator comprising:
   an inverse Fourier transform processor having a plurality of inputs and a plurality of outputs, said inverse Fourier transform processor configured to receive a plurality of temporal estimations of instantaneous correlations of signals, corresponding to the same block and tone, received from first and next antennas in an orthogonal frequency division multiplexing multi-carrier communication system adaptive antenna array;

a plurality of filters having inputs and outputs, said filters operably configured to receive the inverse Fourier transforms of said plurality of temporal estimations of said instantaneous correlations of signals received from first and next antennas corresponding to the same block and tone output by said inverse Fourier transform processor; and a Fourier transform processor having a plurality of inputs and a plurality of outputs, said Fourier transform processor configured to receive a plurality of filtered inverse Fourier transforms of temporal estimations of instantaneous correlations of signals received from first and next antennas corresponding to the same block and tone;

whereby said instantaneous correlation parameters are determined using instantaneous time-domain and frequency-domain channel correlations.

26. The instantaneous correlation parameter estimator for a diversity combiner in a multicarrier communication system having a plurality of antennas of claim 25, wherein the wherein the diversity combiner is minimum mean-square-error.

27. A method of suppressing co-channel interference comprising the steps of:

receiving a plurality of signals in an orthogonal frequency division multiplexing multi-carrier communication system using an adaptive antenna array;

determining channel parameters for said received signals;

determining instantaneous correlations for said received signals;

estimating parameter vectors from said channel parameters and said instantaneous correlations; and combining a plurality of received signals in a minimum-mean-square-error diversity combiner and determining a combined received signal therefrom, said diversity combiner combining said plurality of received signals in accordance with said estimated parameter vectors.

28. The method of claim 27, wherein said parameter vector is estimated by two pass channel parameter estimation.

* * * * *